United States Patent

Logan

[11] 4,019,241
[45] Apr. 26, 1977

[54] METHOD OF SPLICING ELONGATE MEMBERS

[75] Inventor: Maurus C. Logan, Elizabeth, N.J.

[73] Assignee: Thomas & Betts Corporation, Elizabeth, N.J.

[22] Filed: Nov. 10, 1975

[21] Appl. No.: 630,747

[52] U.S. Cl. .................................. 29/407; 29/447; 24/81 PE; 24/115 A; 174/84 R; 264/230; 350/96 C; 403/273; 403/274

[51] Int. Cl.² ......................................... B23Q 17/00

[58] Field of Search .......... 29/447, 407, 517, 518; 350/96 C, 320, 96 WG; 174/DIG. 8, 84 R; 264/230; 403/273, 274, 284; 24/81 CC, 81 PE, 115 A

[56] References Cited
UNITED STATES PATENTS

| | | | |
|---|---|---|---|
| 2,161,423 | 6/1939 | McConnell | 24/115 A UX |
| 3,093,448 | 6/1963 | Kirkpatrick et al. | 174/DIG. 8 UX |
| 3,216,091 | 11/1965 | Floyd | 29/518 X |
| 3,513,429 | 5/1970 | Helsop | 29/447 UX |
| 3,535,017 | 10/1970 | Miller | 350/96 WG UX |
| 3,544,672 | 12/1970 | Goda et al. | 29/447 UX |
| 3,551,999 | 1/1971 | Gutmann | 29/517 |
| 3,768,146 | 10/1973 | Braun | 350/320 X |
| 3,864,018 | 2/1975 | Miller | 350/96 C |

*Primary Examiner*—Charlie T. Moon
*Attorney, Agent, or Firm*—David Teschner; Jesse Woldman

[57] ABSTRACT

The interior passageway formed at the central axis of a bundle of at least three cylindrical elements which are drawn together within a contractable outer member serves to maintain the ends of optical fibers or the like in accurate axial alignment to provide a splice joint or connection thereat.

7 Claims, 13 Drawing Figures

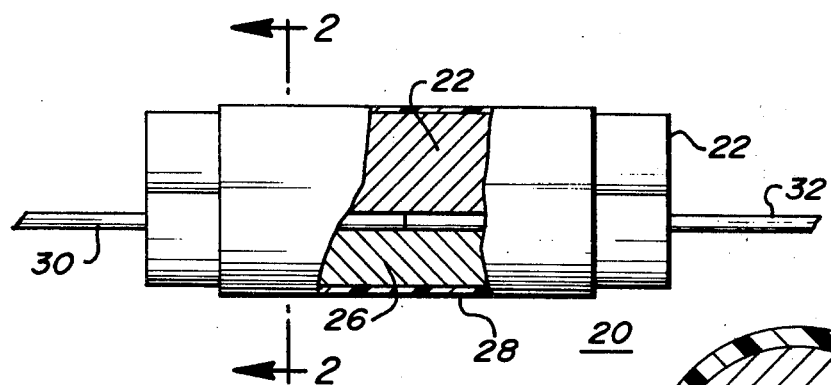
FIG. 1
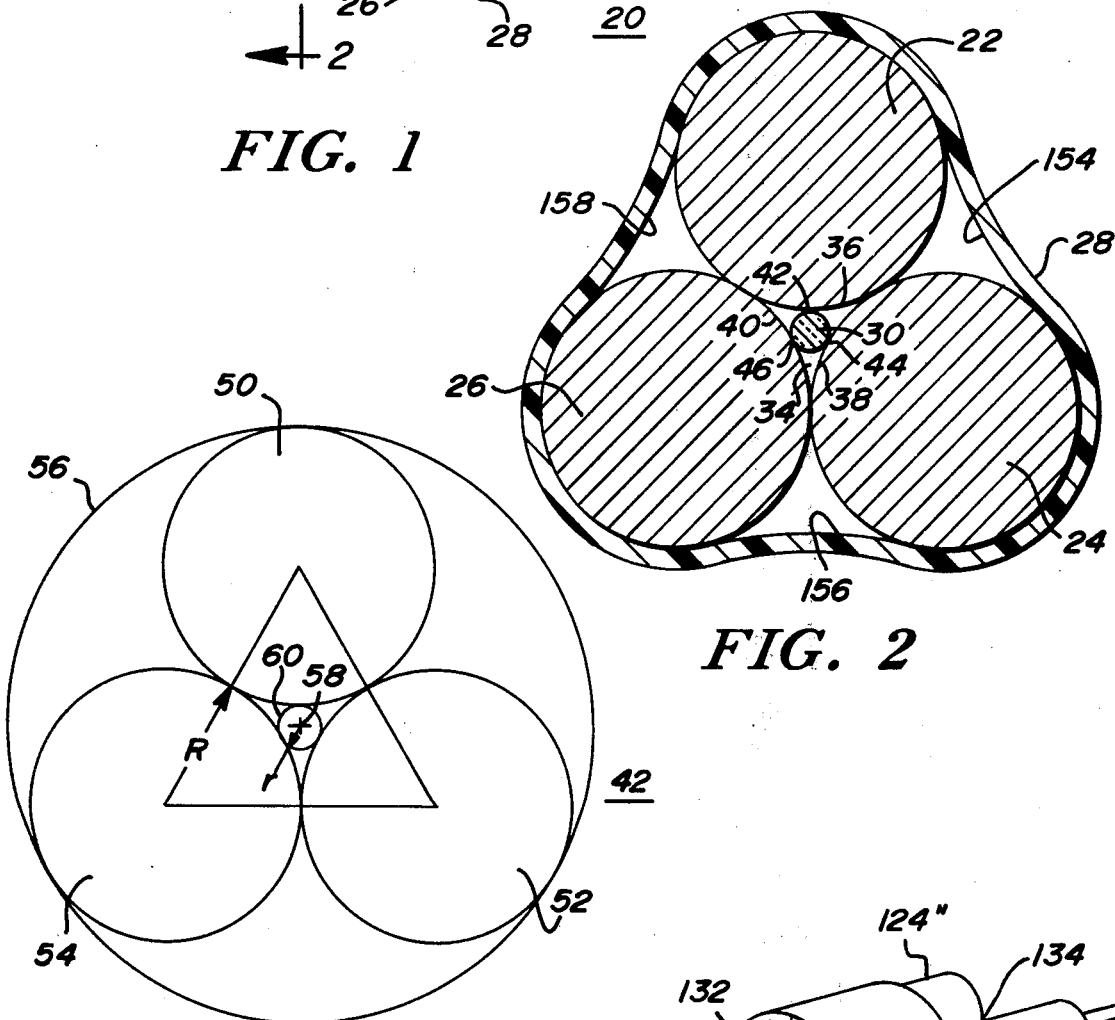
FIG. 2
FIG. 3
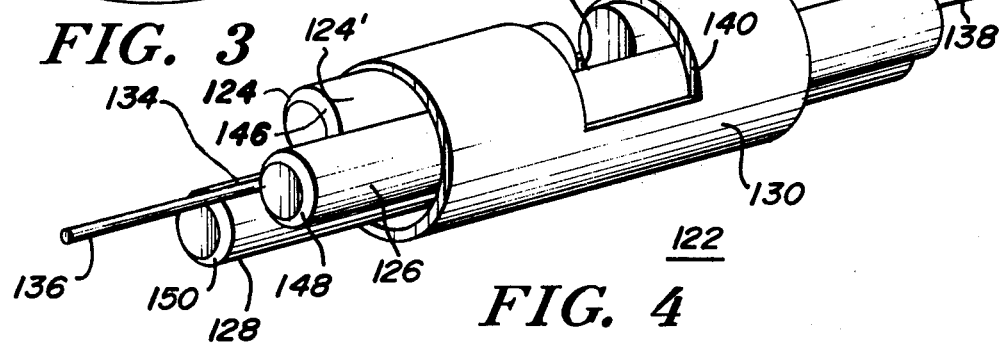
FIG. 4

METHOD OF SPLICING ELONGATE MEMBERS

BACKGROUND OF THE INVENTION

1. Field of the Invention

The invention is directed to the field of joining means and principally to a means and method for joining elongate members.

2. Description of the Prior Art

Many applications require the accurate axial alignment of the ends of elongate elements to provide a splice joint thereat. For example, in the field of fiber optics, an inherent problem has been the need for maintaining extremely accurate axial alignment between the abutting ends of two optical fibers which are to be joined or spliced together to avoid serious deterioration or loss of the transmitted light through the joint. One solution to this problem is disclosed in U.S. Pat. No. 3,768,146 issued Oct. 30, 1972 to F. A. Braun, which describes the employment of a V-shaped groove which is cut in a metallic base as the means of alignment. It is evident that the accuracy of alignment in such a device is totally dependent upon the accuracy of a machined groove which is subject to the limitations normally found in metal cutting equipment. Such device also suffers from the lack of any means to insure that the crimping operation will not displace the ends of the fibers, resulting in an imperfect alignment. Other arrangements in which a sleeve member or the like is designed to be crimped directly about the joint presents similar problems since it is well known that the radial compression of a tubular member results in an imperfect and unsymmetrical contraction of the interior thereof which is totally unacceptable as a means for providing an accurate bore or passageway throughout the length thereof, where such is necessary to insure linear axial alignment between elements located within the tubular member.

SUMMARY OF THE INVENTION

The invention overcomes the limitations and difficulties noted above with respect to prior art devices by providing a rapid, convenient, inexpensive and reliable means and method for joining the ends of elongate members such as optical fibers or the like in true axial alignment. The ends of the elongate members which are to be joined or spliced together are disposed within an interior longitudinally extending passageway defined by the inwardly facing portions of at least three uniformly diametered cylindrical elements arranged in a bundle and drawn together by a contractable outer member placed around the bundle. The cylindrical elements may be either solid or hollow, of similar or differing lengths, and of similar or differing outer diameters, but in each case having a uniform, accurately dimensioned outer diameter. The contractable member may comprise a sleeve-like element disposed about the cylindrical elements and physically contractable either by heating, extruding, compressing, or other like operations thereon. A sizing mandrel may be provided to control the initial size of the interior opening of the device prior to the placement of the elongate members therein. Upon contraction of the contractable member, the cylindrical elements are drawn more tightly together and displaced radially inwardly towards the central axis of the bundle and into tangential contacting engagement with the encompassed elongate members. It is therefore an object of this invention to provide a means and method for aligning the ends of elongate members.

It is another object of this invention to provide a means and method for maintaining the ends of elongate members in accurate axial alignment in a splice joint or the like.

It is a further object of this invention to provide a means and method for splicing optical fibers.

It is yet another object of this invention to produce an accurately aligned splice between the abutting ends of optical fibers or the like.

It is still a further object of this invention to utilize a contractable bundle of at least three accurately dimensioned cylindrical elements as a splice means for optical fibers or the like.

Other objects and features will be pointed out in the following description and claims and illustrated in the accompanying drawings which disclose, by way of example, the principal of the invention and the best modes contemplated for carrying it out.

BRIEF DESCRIPTION OF THE DRAWINGS

In the Drawings;

FIG. 1 is a side view, partly cut away and partly in section, of a means for splicing elongate members, in accordance with the concepts of the invention.

FIG. 2 is an enlarged sectional view taken along the line 2—2 of FIG. 1.

FIG. 3 is a geometric representation illustrating a method of calculating the dimensions of the device of FIG. 1.

FIG. 4 is a perspective view of another embodiment of a means for splicing elongate members in accordance with the concepts of the invention.

Similar elements are given similar reference characters in each of the respective drawings.

DESCRIPTION OF THE PREFERRED EMBODIMENTS

Figure 5:
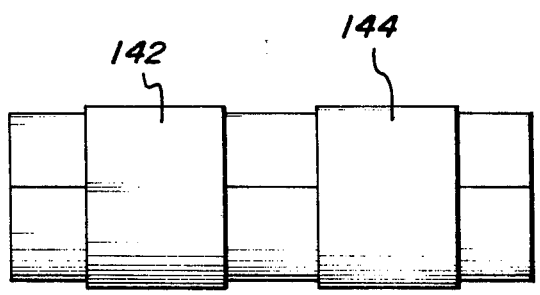
FIG. 5 is a side view of a further embodiment of the invention.

Referring now to FIGS. 1 and 2, there is shown a bundle 20 comprising three elongate cylindrical elements 22, 24, and 26 about which is disposed a contractable member 28 and within which are joined the ends of a pair of elongate members 30 and 32 which, for the sake of explanation, are illustrated as optical fibers. The contractable member 28 is shown as formed from plastic material which may comprise a shrinkable material activated by, for example, the application of heat, chemical solvents, radiation or the like, causing the member 28 to radially contract. The cylindrical elements 22, 24, and 26 are formed preferably of metallic material such as drill rod or the like which, by virtue of present metal working techniques can be readily, conveniently, and inexpensively manufactured to extremely close tolerances both in straightness and diameter. The elements 22, 24, and 26, for purposes of the invention, may be of either equal or unequal diameter provided that each element is, however, of uniform outer diameter throughout its operative length, that is, the length which is employed to engage the fibers 30 and 32 within the bundle 20. By bundling such elements 22, 24, and 26 together in parallel axial relationship with one another, there is generated a longitudinally extending passageway 34 (FIG. 2) defined by the respective cusps 36, 38, and 40 of the elements 22, 24, and 26 resulting from the bundled configuration. The cusps 36, 38, and 40 thus provide a series of three tangential line contacts as at 42, 44, and 46, respectively, with the optical fibers 30 and 32 where the elements 22, 24, and 26 have been suitably dimensioned.

Figure 9:
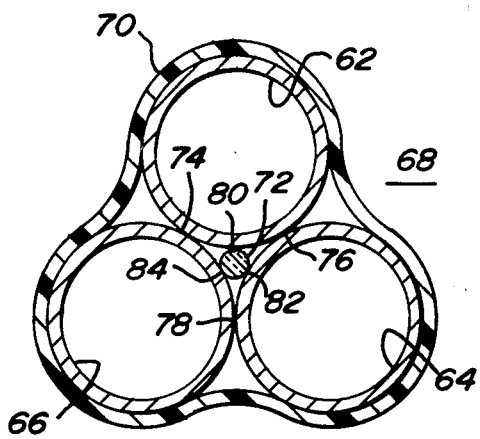
FIGS. 9, 10, and 11 are sectional views of yet further embodiments of means for splicing elongate members in accordance with the concepts of the invention.
Figure 10:
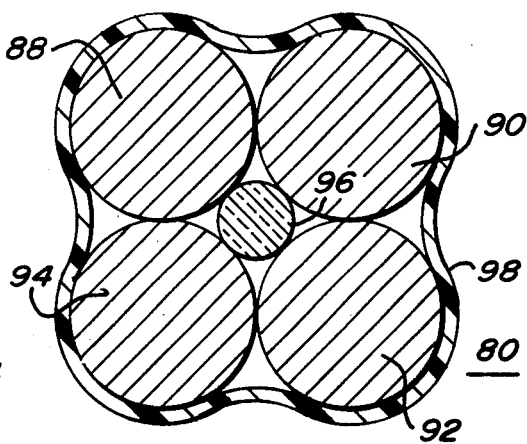
Figure 11:
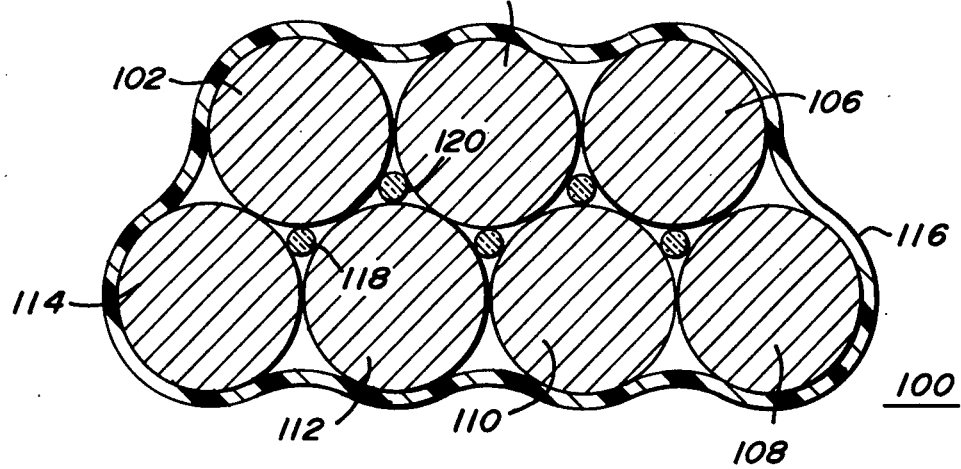

In this regard, reference is now made to FIG. 3 where there is shown a geometric representation 48 comprising three circles 50, 52, 54 inscribed within and tangent to the cusps formed by the juxtaposition of the circles 50, 52 and 54. The radius of the circles 50, 52, and 54, which are shown as having equal diameters, is indicated by the symbol $R$, whereas the radius of the smaller inscribed circle 60 is indicated by the symbol $r$. By simple geometric analysis, the ratio of the radius $r$ to the radius $R$ is closely approximated as 1:6.4675. Thus, assuming the size of the fibers 30 and 32 are equal, and known, it is a simple matter to calculate the diameter of the elements 22, 24 and 26 so as to provide a bundled arrangement whereby the fibers 30 and 32 are tightly held in accurate axial alignment within the center of the bundle 20 upon contraction of the contractable member 28. For example, to insure tangential contacting engagement between the fibers 30 and 32 and the elements 22, 24, and 26 along the lines 42, 44, and 46, respectively, one would calculate the value $R$ from the above noted ratio, providing the diameter of the fibers 30 and 32 was known, and would then provide the elements 22, 24 and 26 with an outer diameter slightly smaller than the calculated value of $R$ so that the diameter of a circle such as 60 inscribed within the bundled configuration would be slightly less than the diameter of the fibers 30 and 32. It is thus readily apparent that the actual size of the opening or passageway 34 between the cylindrical elements 22, 24 and 26 may be easily determined to an extremely high degree of accuracy and may be readily provided within an extremely close tolerance by virtue of the above described bundled arrangement. This is especially important where the device and method of the instant invention is employed to provide a splice between optical fibers since such fibers are generally readily susceptible to breakage or distortion in the event undue pressure is exerted thereon. It is thus seen that by varying and controlling the compression force generated by the contractable member 28 upon the elements 22, 24, and 26, one may readily achieve the desired mechanical pressure against the fibers 30 and 32 to insure mechanical stability while obtaining true axial alignment of the fibers within the bundle 20. Such axial alignment is, of course, necessary to insure that the maximum degree of transmission will occur across the splice joint. The solid elements 22, 24, and 26 may be replaced by hollow elements such as 62, 64, and 66 shown in FIG. 9 which illustrates a bundle 68 including a contractable member 70 similar to the member 28, disposed about the elements 62, 64, and 66, and an optical fiber 72 similar to fibers 30 and 32, situated within the bundle 68. By suitably varying the wall thickness of the elements 62, 64, and 66 which elements, incidentally, may be fabricated from any suitable metallic or non-metallic material, a certain degree of flexibility of the walls of the elements 62, 64, and 66 may be obtained, which may be found advantageous to provide an additional measure of stability in the assembly since each of the elements 62, 64, and 66 may be caused to tangentially contact one another as at 74, 76, and 78 while simultaneously tangentially contacting the fiber 72 as at 80, 82, and 84. Although the triangularly arranged bundle described above with respect to the embodiments shown in FIGS. 1, 2, and 9 will be perfectly adequate in most cases, further elements may be added, as shown, for example, in FIGS. 10 and 11 to provide alternative arrangements. FIG. 10 illustrates a bundle 86 comprising four cylindrical elements 88, 90, 92, and 94 similar to elements 22, 24, and 26, and arranged in a symmetrical pattern about a fiber 96. The bundle 80 is retained within a contractable member 98 which may be formed of material identical to that indicated heretofore with respect to the member 28 shown in FIGS. 1 and 2. It will, of course, be appreciated that the geometry of the bundle 80, being different than the triangular configuration heretofore described, will produce a different ratio between the respective diameters of the fiber to be held and the cylindrical elements constituting the bundle 80, such ratio being, of course, readily determinable by simple geometric analysis. FIG. 11 illustrates a further embodiment of a splice means 100 constructed in accordance with the concepts of the invention in which a plurality, namely seven, cylindrical elements 103, 104, 106, 108, 110, 112, and 114, similar to elements 22, 24, and 26, are shown in bundled disposition enclosed within a contractable member 116 which may be fabricated from material essentially similar to that described heretofore with respect to the member 28. In this arrangement, each group of three elements generates a distinct passageway for the receipt of the ends of a pair of optical fibers to provide a splice joint therefor. For example, cylindrical elements 102, 114, and 112, form a splice means for an optical fiber 118, while elements 102, 104, and 112 provide a similar splice means for a fiber 120. Thus, the means 100 provides five distinct passageways or splice joints for respective fibers. The number of elements shown in FIG. 11 may of course be increased or decreased to provide alternative arrangements each operative in a similar manner to provide a particular series of splice joints, as necessary or desirable.

FIG. 4 illustrates a further embodiment of a bundle 122 of cylindrical elements 124, 126, and 128 disposed within a contractable member 130 similar to element 28. The element 124 has been divided into two parts, 124' and 124'' which are spaced from one another to provide an opening or gap 132 therebetween. As further shown, the element 124 is shorter in length than the remaining elements 126 and 128, to provide a guide trough 134 defined by the extending portion of elements 126 and 128 to facilitate the insertion of fibers 136 and 138 into the bundle 122. The contractable member 130 is provided with an opening 140 coincident with the gap 132 to permit the user to observe the disposition of the fibers 136 and 138 within the bundle 122. The contractable member 122 may also comprise a pair of discrete sleeves, as shown at 142 and 144 in FIG. 5, in which case, when employed with the embodiment shown in FIG. 4, will provide an inspection opening similar to opening 140. As further illustrated in FIG. 45 the elements 124, 126, and 128 are provided with tapered ends as at 146, 148, and 150, respectively, to further facilitate the introduction of the fibers 136 and 138 into the bundle 122.

Figure 6:
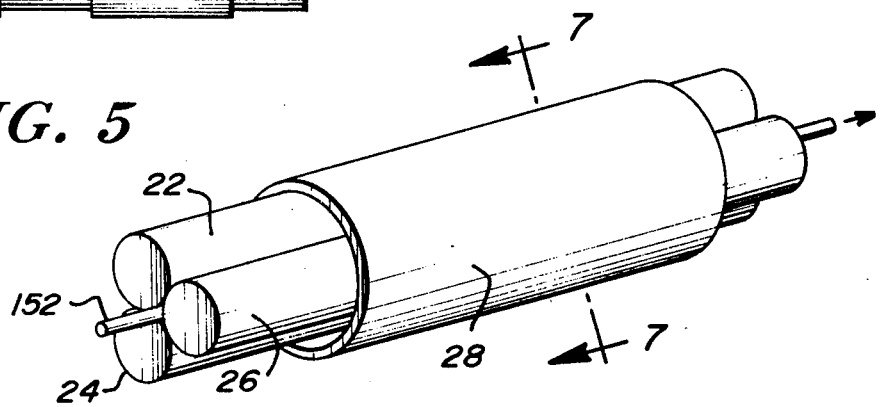
FIG. 6 is a perspective view of yet another embodiment of a means for splicing elongate members in accordance with the concepts of the invention.
Figure 7:
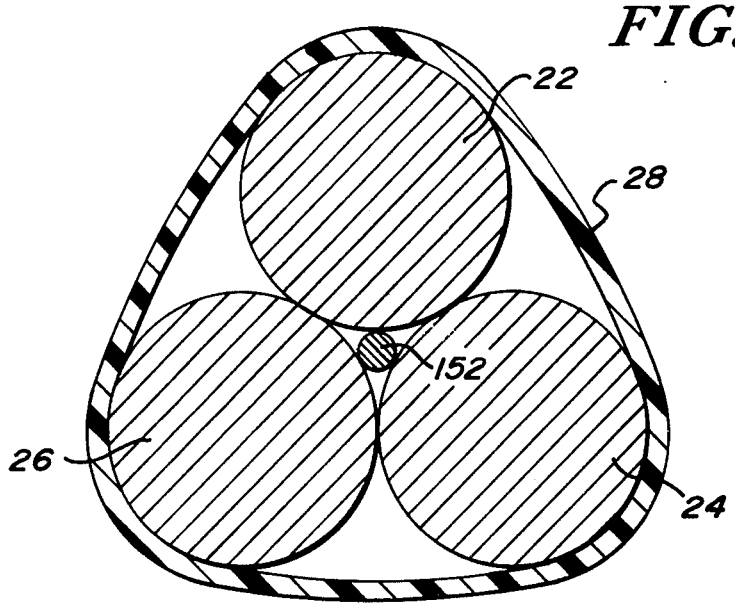
FIG. 7 is an enlarged sectional view taken along the line 7—7 of FIG. 6.
Figure 8:
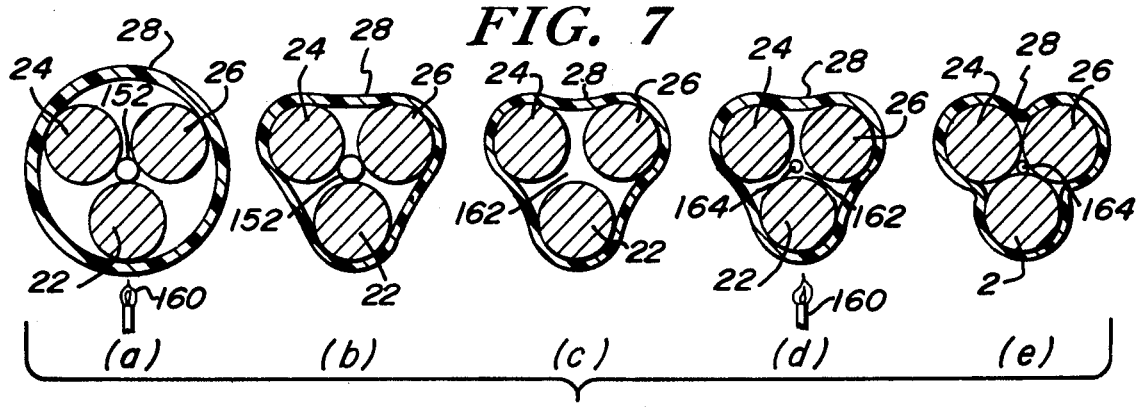
FIGS. 8a, 8b, 8c, 8d, and 8e are sectional views showing the steps of a method of splicing elongate members in accordance with the concepts of the invention.
Figure 12:
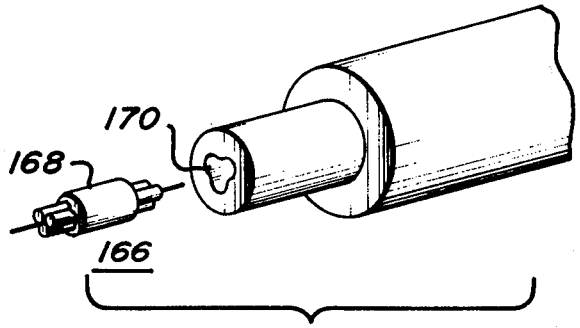
FIG. 12 is a fragmentary perspective view of a further emboidment of a step in a method of splicing elongate members in accordance with the concepts of the invention.

Referring now to FIGS. 6 and 7, there is shown the bundle 20 in which is disposed a mandrel 152. In this embodiment mandrel 152 serves to control the initial size of the opening or passageway 34 during an initial contraction of the contractable member 28 preparatory to inserting the ends of the fibers 30 and 32 therewithin. It should be observed that the contractable member 28 is shown in FIG. 7 in a relaxed state, whereas in FIGS. 1 and 2, the member 28 has been contracted about the bundle of cylindrical elements 22, 24, and 26 by the employment of suitable contracting means which will be described in greater detail hereafter. It will also be appreciated that the member 28, when contracted about the cylindrical elements 22, 24, and 26, as in FIGS. 1 and 2, will tend to at least partially flow or form about the external perimeter of such elements, and will at least partially intrude into the external spaces between such elements, as at 154, 156, and 158, thereby further retaining the elements 22, 24, and 26 in the desired position. Returning now to FIGS. 6 and 7, the mandrel 152 is inserted into the assembly consisting of the three elements 22, 24, and 26 encompassed within the sleeve-like contractable member 28 to provide an initial assembly shown in detail in FIG. 7. The contractable member 28 may now be caused to be partially contracted in a first stage of contraction, whereby the elements 22, 24, and 26 will be displaced or forced radially inwardly against the mandrel 152. For the sake of illustration, reference is also made to FIGS. 8a, 8b, 8c, 8d, and 8e which shows a series of steps of a method of making a splice in accordance with the concepts of the invention. The initial contraction of the member 28 is shown in FIG. 8a as being accomplished by the selective application of heat, symbolized by the flame 160, for a predetermined length of time in accordance with the characteristics thereof. Various types of heat shrinkable tubing are commercially available and the specifications relating to the physical characteristics thereof are readily obtainable to guide the user in determining the proper time and temperature combination required to obtain either a partial or full contraction of the material. Thus, where the contractable member 28 is fabricated from heat shrinkable material, the application of heat to such member for a predetermined period will cause the member 28 to partially contract wherein the assembly will assume the configuration shown in FIG. 8b. The mandrel 152 is now removed and the resulting assembly is as shown in FIG. 8c. The contractable member 28, having been at least partially deformed in the first step, tends to at least partially encase each of the elements 22, 24, and 26 so as to maintain such elements in a relatively fixed position after removal of the mandrel 152. The diameter of the mandrel 152 is chosen so as to be slightly greater than the diameter of the fibers which are to be spliced wherein a circle inscribed within the resulting central opening or passageway designated as 162 in FIG. 8c, and tangent to the elements 22, 24, and 26 will have a diameter slightly greater than the diameter of the fibers to be spliced. The assembly is now ready to receive the respective end portions of the fibers for splicing, and in the sectional view of FIG. 8d there is shown a sectional view of one of such fibers 164 interposed within the passageway 162, although it should be understood that the respective end portions of two such fibers have been placed in proper position for splicing within the assembly. The resulting assembly is now subjected to the further application of heat to further contract the contractable member 28 about the elements 22, 24, and 26 which are thus caused to tangentially contact the fibers 164 to produce the final spliced joint essentially as shown in FIG. 8e. Although the use of heat shrinkable tubing has been found to be convenient for such applications, the contractable member 28 may be contracted by extrusion in an operation similar to that shown in FIG. 12 wherein a bundle 166 incorporating a contractable outer member 168 which may be formed of either metallic or non-metallic extrudably deformable material is advanced through suitably dimensioned extruding orifices such as 170 in an extrusion tool or the like to accomplish both the initial and final contraction of the member 168.

Figure 13:
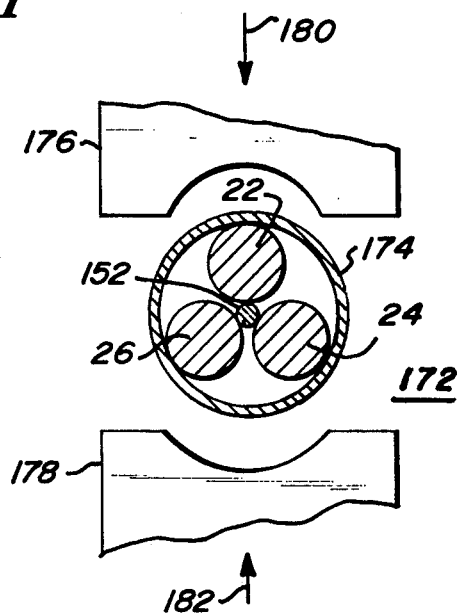
FIG. 13 is a fragmentary front elevational view, partly in section, of still another embodiment of a step in a method of splicing elongate members in accordance with the concepts of the invention.

Referring now to FIG. 13, there is shown a bundle 172 comprising a contractable member 174 formed from metallic material and disposed about the elements 22, 24, and 26 and including the mandrel 152. The assembly is shown placed between the jaws 176 and 178 of a die means, the jaws 176 and 178 being operative in the direction indicated by the arrows 180 and 182, respectively, to selectively radially compress and contract the member 174, as an alternative to the steps shown in FIGS. 8a and 8d.

It should be understood that the above described means and method, although found to be particularly useful for joining or splicing optical fibers, is not intended to be limited thereby, and may be similarly advantageously employed to join or splice other elongate members such as metal or plastic rods, tubes, and conduits.

I claim:
1. A method of maintaining selective portions of two elongate members in axial alignment with one another comprising the steps of: (a) disposing the ends of said elongate members in end-to-end facing disposition adjacent one another within the axial center of a bundle of at least three elongate cylindrical elements each having a uniform outer diameter; (b) disposing a contractable member about said bundle; (c) radially contracting said contractable member about said bundle so as to cause said cylindrical elements to be displaced inwardly in tangential contacting engagement with said elongate members; (d) transversely dividing one of said cylindrical elements into two parts spaced from one another; and (e) providing an opening in said contractable member coincident with the spacing between said two parts of said cylindrical element, for observing the disposition of said elongate members within said bundle.

2. The method as defined in claim 1 wherein said contractable member is contracted by heating, said contractable member comprising a given length of heat shrinkable tubing.

3. The method as defined in claim 1 further comprising the step of disposing the ends of said elongate members in abutting relationship within the axial center of said bundle.

4. A method of splicing optical fibers comprising the steps of: disposing the ends of said optical fibers in abutting end-to-end facing disposition within the axial center of a bundle of at least three elongate hollow cylindrical elements each having a uniform outer diameter; disposing a contractable member about said bundle; radially contracting said contractable member about said bundle so as to cause said cylindrical elements to be displaced inwardly in tangential contacting engagement with said optical fibers; transversely dividing one of said cylindrical elements into two parts spaced from one another; and providing an opening in said contractable member coincident with the spacing between said two parts of said divided cylindrical element, for observing the disposition of said optical fibers within said bundle.

5. The method as defined in claim 4 further comprising the step of tapering the ends of said cylindrical elements to facilitate the insertion of said optical fibers within said bundle.

6. The method as defined in claim 4 further comprising the step of shortening one of said cylindrical elements to provide a guide trough for said optical fibers.

7. The method as defined in claim 4 wherein said contractable member is contracted by heating, said contractable member comprising a given length of heat shrinkable tubing.

* * * * *

UNITED STATES PATENT AND TRADEMARK OFFICE
CERTIFICATE OF CORRECTION

PATENT NO. : 4,019,241

DATED : April 26, 1977

INVENTOR(S) : Maurus C. Logan

It is certified that error appears in the above-identified patent and that said Letters Patent are hereby corrected as shown below:

Column 5, line 9, "45" should be -- 4 --.

Signed and Sealed this ninth Day of August 1977

[SEAL]

Attest:

RUTH C. MASON
Attesting Officer

C. MARSHALL DANN
Commissioner of Patents and Trademarks